United States Patent [19]

Powell

[11] Patent Number: 5,529,743
[45] Date of Patent: Jun. 25, 1996

[54] METHODS FOR THE MANUFACTURE OF CLEAN AIR DUCTS

[75] Inventor: James A. Powell, Akron, Ohio

[73] Assignee: Steere Enterprises, Inc., Tallmadge, Ohio

[21] Appl. No.: 268,831

[22] Filed: Jun. 30, 1994

[51] Int. Cl.$^6$ .......................... B29C 45/14; B29C 49/50; B29C 49/72
[52] U.S. Cl. .......................... 264/513; 264/274; 264/279; 264/506
[58] Field of Search ...................................... 264/506, 513, 264/DIG. 52, 536, 274, 275, 276, 279

[56] References Cited

U.S. PATENT DOCUMENTS

| | | | |
|---|---|---|---|
| 3,291,670 | 12/1966 | Usab | 264/536 |
| 3,793,421 | 2/1971 | Paubandt | 264/536 |
| 4,305,904 | 12/1981 | Black | 264/536 |
| 4,752,208 | 6/1988 | Iwata et al. | 264/513 |
| 5,089,208 | 2/1992 | Nakamura et al. | 264/513 |
| 5,169,590 | 12/1992 | Johnson et al. | 264/506 |
| 5,266,262 | 11/1993 | Narayama et al. | 264/513 |
| 5,330,342 | 7/1994 | Linss et al. | 264/506 |

FOREIGN PATENT DOCUMENTS

| | | | |
|---|---|---|---|
| 59-007024 | 1/1984 | Japan | 264/506 |
| 60-217127 | 10/1985 | Japan | 264/506 |
| 63-290715 | 11/1988 | Japan | 264/513 |
| 3-151223 | 6/1991 | Japan | 264/536 |
| 5-185492 | 7/1993 | Japan | 264/513 |

*Primary Examiner*—Catherine Timm
*Attorney, Agent, or Firm*—Renner, Kenner, Greive, Bobak, Taylor & Weber

[57] ABSTRACT

The present invention provides a method for manufacturing a tubular body member for use as a clean air duct (10) including the steps of providing a blow mold (50) with at least one embedded knife (54), forming a tubular body (12) with an apex (78) where the embedded knife is located; removing the tubular body from the blow mold, and cutting the tubular body at the apex so as to form an open end (14,16). Another method for manufacturing a clean air duct includes the steps of providing a tubular body (12) having at least one open end, inserting the open end onto a mandrel (90), closing an injection mold (110) around the tubular body and the mandrel, and injecting a polymeric material into the mold, to secure a connecting means (30) to the tubular body so as to form the air duct. The method concludes by opening the injection mold and removing the air duct from the injection mold. The invention also includes clean air ducts (10) for interconnecting an air filter to a throttle body comprising a blow molded tubular body (12) with at least one open end (14,16), the open end having an annular ring (72) which terminates at an inwardly extending lip (86); and injection molded connecting means (30) molded around and secured to the annular ring, and the lip.

22 Claims, 3 Drawing Sheets

METHODS FOR THE MANUFACTURE OF CLEAN AIR DUCTS

TECHNICAL FIELD

The present invention relates in general to a clean air duct used to interconnect an automobile engine throttle body to an air filter. More particularly, the present invention relates to a method for the manufacturing a clean air duct wherein a blow molding process is employed to form a flexible tubular body which is then inserted into an injection mold to have an interconnecting cuff molded thereon. Specifically, the tubular body is configured to provide a concentrated compressive sealing force during the injection molding process.

BACKGROUND ART

Air ducts of various lengths and sizes are used to transfer clean, filtered air from an air filter through an engine air intake system. It is also well known to use air ducts to transfer cooled or heated air from within the engine compartment to the passenger compartment of an automobile.

Air ducts have been formed by using a rubber molding process. Although the rubber molded air ducts are effective, they are considered too heavy for use in vehicles requiring lighter weight to improve fuel efficiency. Additionally, rubber molded air ducts are bulky and difficult to mold in the serpentine configurations desired for automobiles with limited space in the engine compartment.

An alternative to using a one-piece rubber molded air duct is a three piece construction which utilizes a thermoplastic blow molded tubular body with injection molded rubber seals affixed to each end thereof. Although lighter and more compact than a rubber air duct, the three piece construction has its own inherent problems. The tubular body must be mechanically secured or adhesively bonded to the seals to effect a connection therebetween that can withstand the vibration and heat within an engine compartment. Furthermore the connection between the tubular body and the molded seal tends to break after the air duct has been repeatedly detached and re-attached to the air filter. A complete break in the connection between the tubular body and the seal renders the air duct unusable. Even a slight break between the two parts may allow unwanted impediments to enter the air intake system of the engine. Moreover, the additional manufacturing steps of independently molding the rubber seals and securing the seals to the tubular body adds additional cost to the air duct.

One approach to providing a more secure connection between the tubular body and the rubber seals affixed to each end is disclosed in U.S. Pat. No. 5,266,262 to Narayama et al. Narayama discloses a plurality of blow molded tubes having an interconnecting single flange thickness injection molded around one end of the tubes. More particularly, after the blow molded tube is removed from the mold and cooled, each end of the tube has its inner diameter modified so as to be coaxial with the tube's outer diameter. This method provides a tube with a reliable inner diameter into which a mandrel can be inserted so as to provide an effective seal therebetween during the injection molding operation. The Narayama patent also discloses a method wherein the injection mold is sized to seal around the outer diameter of the blow molded tube.

Although the Narayama patent is an improvement over prior types of air ducts, there are still several limitations. First, the method taught requires an additional manufacturing operation for modifying the diameter of the tube, which increases the cost of the air duct. Moreover, the boring or grinding machine which is employed to modify the inner diameter of the tube is likely to leave frangible pieces of plastic material that may enter the air intake system of the engine. Secondly, the patent reveals that projections are provided on the blow molded tube to more securely couple the injection molded part to the tube. Finally, the positioning of the blow molded tubular body within the injection molding cavity only restrains the movement thereof at two places, around the circumference of the tubular body and at an outwardly extending flange. This positioning permits the tubular body to "float" within the injection mold cavity, thereby allowing dimensional fluctuation of the finished air duct.

Although it is known to provide a rubber molded or combination molded air duct, the prior art does not disclose a method for manufacturing an air duct by injection molding end connecting means or cuffs over a blow molded tubular body that provides a less costly, more reliable interconnection between the two moldings. Furthermore, the prior art does not provide a method for manufacturing an air duct by injection molding end connecting means over a blow molded tube that positively ensures dimensional stability of the finished product. The present invention provides such a method and air duct, thereby increasing the reliability of the air duct manufacturing process and reducing the cost of the finished article.

DISCLOSURE OF THE INVENTION

It is therefore an object of the present invention to provide a clean air duct with a blow molded tubular body and connecting means injection molded to the ends thereof.

It is another object of the present invention to provide a clean air duct that is light, sturdy and dimensionally stable.

It is yet another object of the present invention to provide a clean air duct used in conjunction with an air intake system of an engine that is easily attachable and detachable.

It is a further object of the present invention to provide a method for manufacturing a clean air duct that provides a cost savings when compared with other methods.

At least one or more of the foregoing objects, together with the advantages thereof over known art relating to air ducts and manufacturing the same, which shall become apparent from the specification which follows, are accomplished by the invention as hereinafter described and claimed.

In general, the present invention provides a method for manufacturing a tubular body member for use in a clean air duct comprising the steps of providing a blow mold with at least one imbedded knife; forming a tubular body in the blow mold, the tubular body having an apex where the imbedded knife is located; removing the tubular body from the blow mold; and cutting the tubular body at the apex so as to form an open end.

The present invention provides another method for manufacturing a clean air duct comprising the steps of providing a tubular body having at least one open end; obturating the open end with a mandrel; closing an injection mold around the tubular body and the mandrel; injecting a polymeric material into the injection mold to secure connecting means to the tubular body so as to form the air duct; opening the injection mold; and removing the air duct from the injection mold.

The present invention also includes a clean air duct for interconnecting an air filter to a throttle body comprising a blow molded tubular body with at least one open end; the open end providing an annular ring which terminates at an inwardly extending lip; and injection molded connecting means molded around and secured to the annular ring and the lip.

PREFERRED EMBODIMENT FOR CARRYING OUT THE INVENTION

Figure 1:
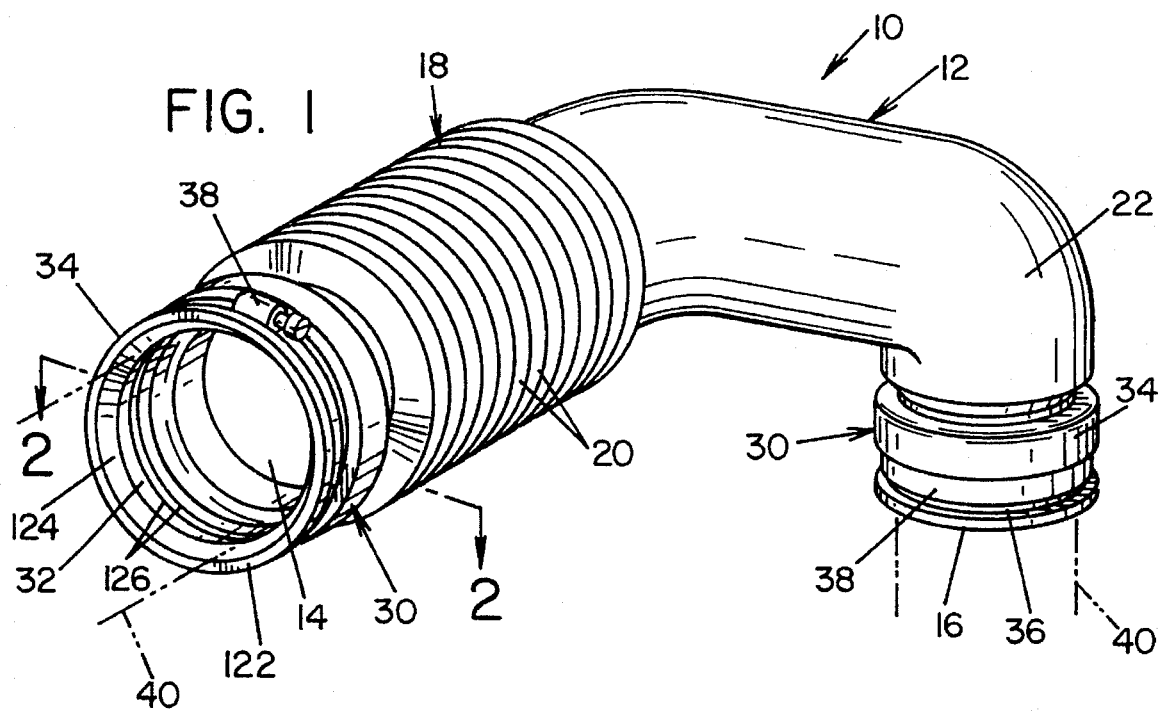
FIG. 1 is a perspective view of a blow molded tubular body with a cuff injection molded to both ends thereof, according to the present invention.

With reference to the drawings, and in particular to FIG. 1, an air duct according to the present invention is referred to generally by the numeral 10. The air duct 10 has a tubular body 12 with an open flex end 14 opposite an open angle end 16. Extending from the open flex end 14, the tubular body 12 has a flexible section 18 consisting of a plurality of sequentially spaced convolutions 20. Extending from the flexible section 18 is an angle section 22 which terminates at the open angle end 16. Although a flexible angular configuration is represented for the tubular body 12 shown in FIG. 1, it should be appreciated that any size, shape or configuration of a tubular body may be used for transferring a flow of air from one point to another, while still incorporating the elements of the present invention.

Figure 2:
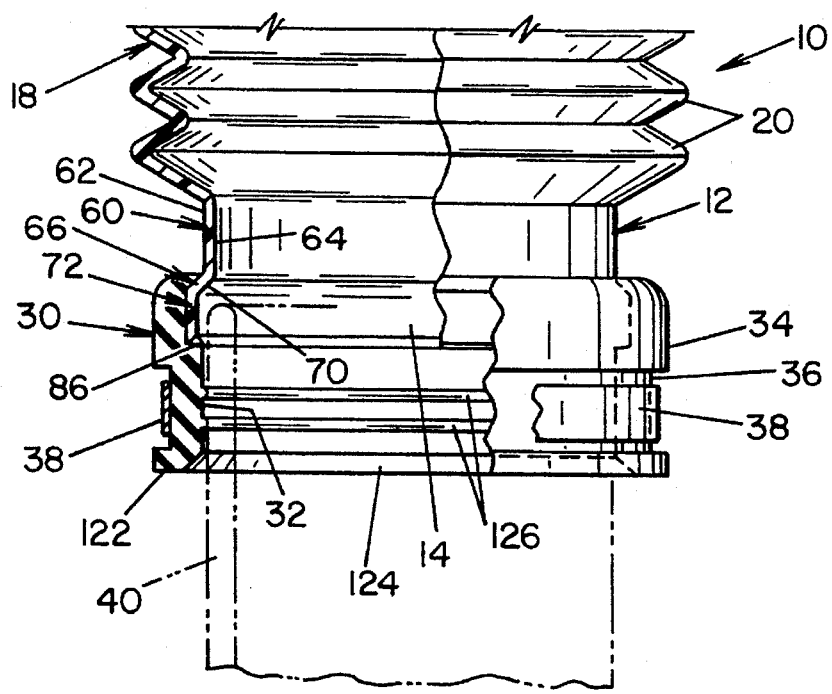
FIG. 2 is a partial sectional view, taken substantially along line 2—2 of FIG. 1, of an air duct according to the present invention showing the air duct secured to a port or other similar type receptacle.

Referring to FIG. 2, it can be seen that a connecting means 30 in the form of a cuff is secured around the open flex end 14. A similar connecting means 30 is also secured around the open angle end 16. The connecting means or cuff is provided to enable the air duct 10 to be attached or connected to the throttle body and to the air filter, or similar structure. The open flex end 14 and the open angle end 16 are configured in an identical manner. The cuff 30 has a interior surface 32 and an exterior surface 34. Disposed around the exterior surface 34 is an annular recess 36 for receiving an adjustable clamp 38. As is well known in the art, each cuff 30 is inserted onto an air filter port, throttle body, or other similar receptacle device, referred to by the numeral 40, and secured thereto by the adjustable clamp 38.

Figure 3:
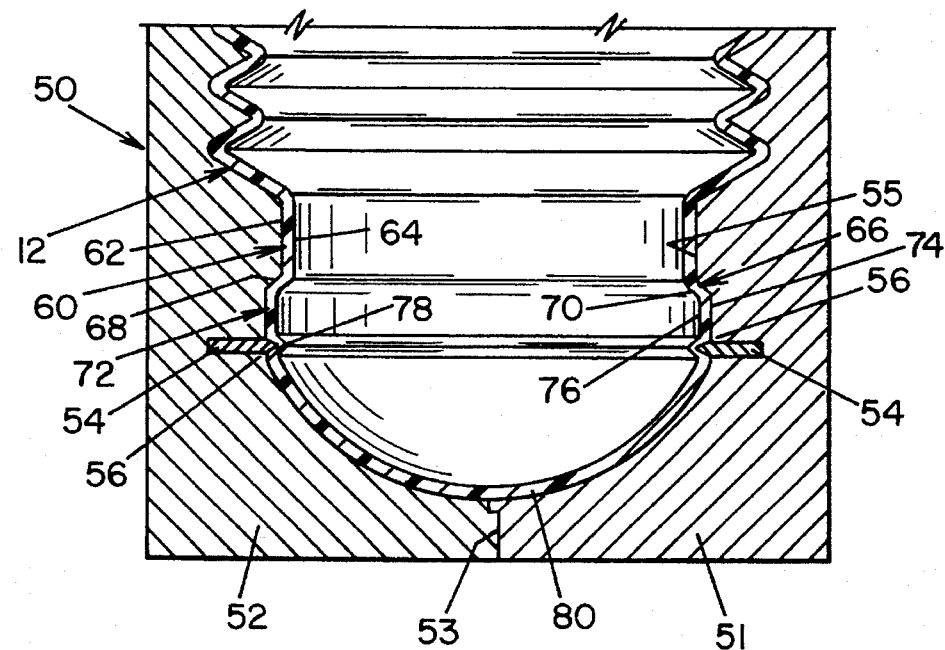
FIG. 3 is a sectional view of a blow mold with a blow molded tubular body disposed therein.

Referring now to FIG. 3, the tubular body 12 is formed in a blow mold, referred to generally by the numeral 50. The blow mold 50 comprises a right section 51 mateably engageable with a left section 52 at a parting line 53. When both left and right sections 51, 52 are closed, an embedded knife 54 will extend inwardly into the cavity 55 of the mold 50 at 56. Of course, there will be an embedded knife 54 at both ends of the blow mold 50.

Figure 4:
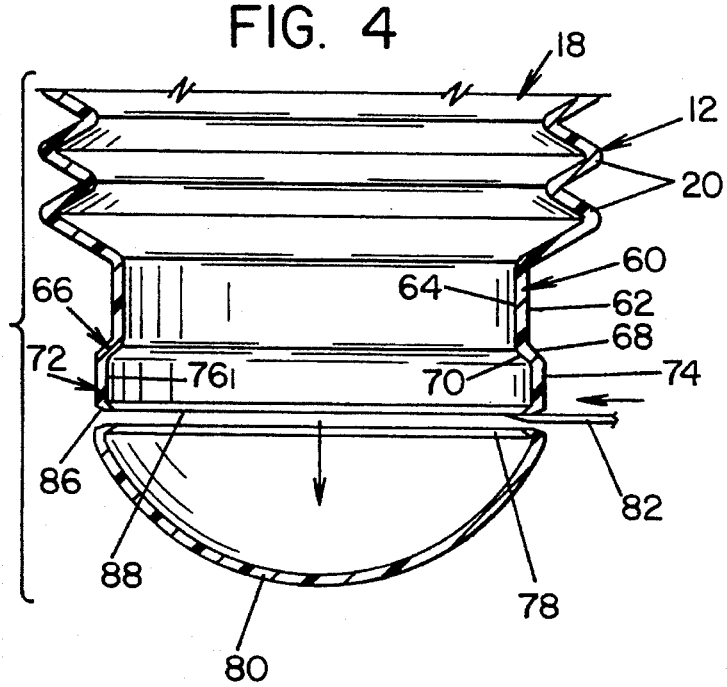
FIG. 4 is a sectional view of a blow molded tubular body wherein a bubble portion of the tubular body is removed by a knife.

As can be seen in FIG. 4, after the tubular body 12 is removed from the blow mold 50, a finishing operation is performed to the ends 14,16. In particular the tubular body has extending downwardly therefrom an annular neck 60, with an exterior surface 62 and an interior surface 64. Extending outwardly and downwardly from annular neck 60 is an annular shoulder 66, which has an exterior surface 68 and an interior surface 70. Extending downwardly from the annular shoulder 66 is an annular ring 72 which has an exterior surface 74 and an interior surface 76. Extending from the annular ring 72 is an inwardly directed apex 78 which was formed by the embedded knife 54. Also integral with the apex 78 is a bubble portion 80, which temporarily functions as an end-piece for the tubular body. It should be appreciated that the embedded knife 54 causes the apex 78 to have an appreciably thinner wall thickness than the remainder of the tubular body 12.

Figure 4A:
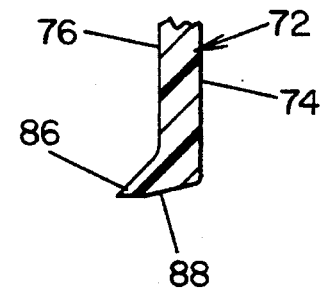
FIG. 4A is a detail sectional view of a lip of the tubular body after the bubble portion has been removed.

The thin wall thickness at the apex 78 permits a knife 82 to cut through the circumference of the apex so as to remove the bubble 80. With the bubble 80 removed the construction of the tubular body 12 is complete. As best seen in FIG. 4A, the knife 82 will cut the apex 78 so as to leave an inwardly extending lip 86 which has a lip surface 88 substantially perpendicular to the exterior surface 74 of the annular ring 72. It should be appreciated that the inner diameter of the lip 86 is less than the diameter of the interior surface 76 of the annular ring 72. Moreover, the inner diameter of the lip 86 is greater than the interior surface 64 of the annular neck 60. Additionally, the apex 78 will function as a guide for the knife 82 so as to provide a smooth even cut.

Figure 5:
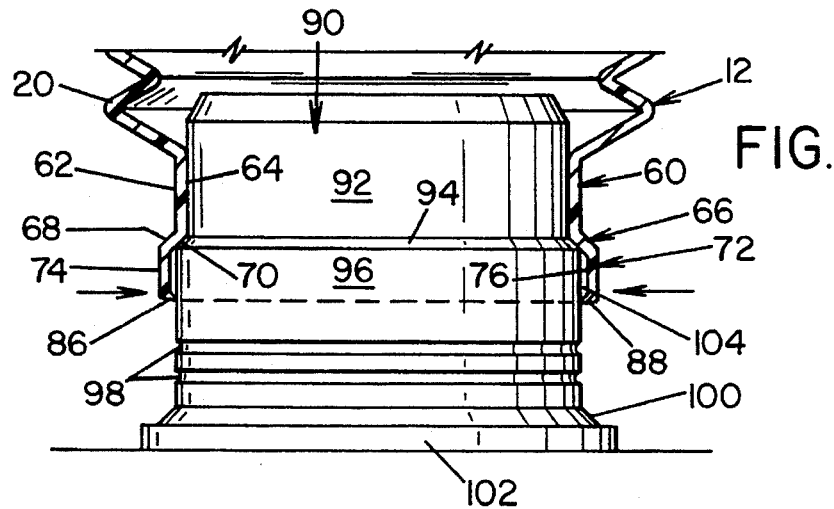
FIG. 5 is a partial sectional view of an injection molding core or mandrel inserted into an open end of the blow molded tubular body.

After the bubble portion 80 has been removed, the open ends 14,16 are obturated with a mandrel, generally designated by the numeral 90 as shown in FIG. 5, which can be facilitated by inserting the open end onto the mandrel. The mandrel 90, also referred to as the sealing core, functions to form the cuff interior 32 and positively position the tubular body 12 thereon. The mandrel 90 consists of a central core 92 that has a diameter as large or slightly larger than the annular neck interior surface 64. Extending outwardly and downwardly from the central core is a first shoulder 94. When the open ends 14,16 are inserted onto the mandrel 90, the first shoulder 94 will abut the annular shoulder interior 70. Extending downwardly from the first shoulder 94 is a second core 96. The second core 96 has a diameter larger than that of the inwardly extending lip 86. As such, when the open ends 14,16 are inserted onto the mandrel 90, the lip 86 will exert a compressive sealing force onto the second core 96. The second core 96 has at least one annular groove 98. Extending outwardly and downwardly from the second core is a second shoulder or taper 100, which functions as a lead-in during assembly, from which extends a sealing face 102. It should be appreciated that the area bounded by the second core 96, the lip 86, the annular ring interior 76, and the annular shoulder interior 70 forms an annular cavity 104.

Figure 6:
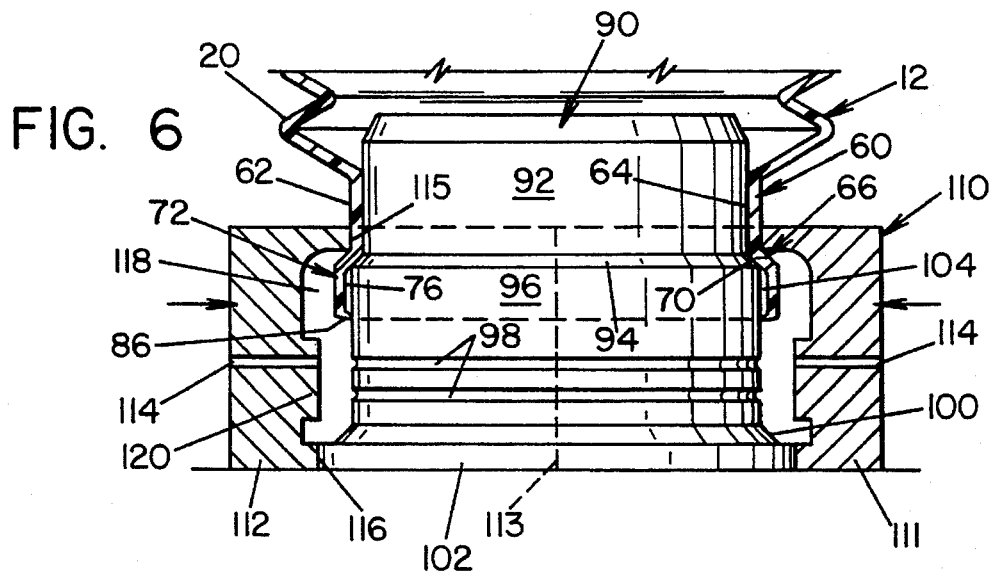
FIG. 6 is a partial sectional view of an injection mold for forming a cuff onto the end of the tubular body with the core or mandrel inserted therein.

Referring now to FIG. 6, the tubular body 12 with a mandrel 90 inserted into each end 14,16 is placed into a cuff mold 110. The cuff mold 110 comprises a right section 111 mateably engageable with a left section 112 at parting line 113. Contained within either or both right section 111 and left section 112 is at least one gate 114 for injecting molten polymeric material. The cuff mold 110 has a neck sealing surface 115 at one end thereof. The opposite end of the mold 110 has a front sealing surface 116. Therefore, as seen in FIG. 6, the neck sealing surface 115 is sized to slightly compress the annular neck exterior 62. Likewise, the front sealing surface 116 is sized to fit around the sealing face 102. Therefore, the cuff mold 110 creates a compressive seal around the annular neck 60 and the sealing face 102 so as to form a cavity 118.

Figure 7:
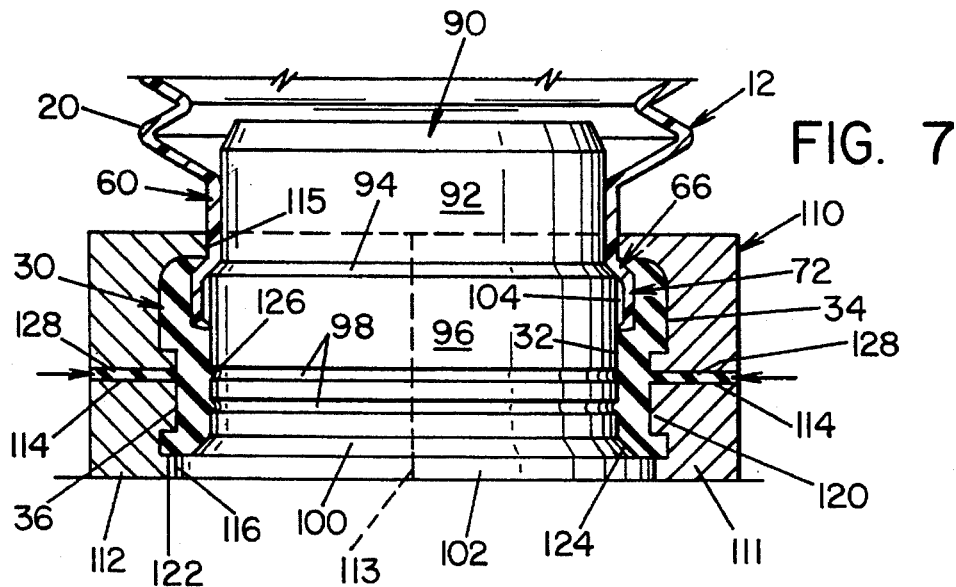
FIG. 7 is a partial sectional view of molding material injected into the cavity of the cuff mold so as to bond to the tubular body.

Molten polymeric material is injected through the gates 114 into the cavity 118 which forms the cuff 30. In particular, FIG. 7 shows that the cuff mold 110 has an annular ridge 120 which forms the annular recess 36 of cuff 30. Perpendicular to the exterior 34 is a front face 122 which is formed by the sealing face 102. Providing a transition from the front face 122 to the interior surface 32 of cuff 30 is a truncated conical section 124, which is formed by the second shoulder 100 of the second core 96. The cuff interior 32 has at least one annular rib 126 which is formed by the corresponding annular groove 98. The polymeric material remaining in the gate 114 after the injection step is a sprue 128. Although the gate 114 is shown integral with the annular ridge 120 it should be appreciated that the gate could be located anywhere in the cuff mold 110 to facilitate the injection molding process.

It will be appreciated by those skilled in the art that attempting to injection mold over a blow molded part is very difficult for several reasons. Primarily, the blow molded part tends to have an internal concave surface where the sections of the blow mold come together. This internal concave surface does not provide a uniform surface around which an injection mold can seal. If a uniform seal cannot be obtained around the blow molded part, the injection molding material will leak into any voids so as to prevent the injection mold from properly filling. Furthermore, if a high pressure level is not maintained within the injection mold cavity, the cavity 118 will not completely fill and a proper bond will not be obtained between the injection molded and blow molded parts.

To overcome the aforementioned problems, the present invention provides a novel method to ensure that an injection molded cuff is properly secured to a blow molded tubular body. In particular, the blow mold 50 is closed with the requisite amount of polymeric material therein and injected with air until a tubular body 12 is formed. Although any polymeric material may be used for the tubular body 12, in the preferred embodiment, the tubular body will be made of a rubber modified polypropylene such as polypropylene/ ethylene propylene diene terpolymer (EPDM) blends. Typically, the EPDM used will have a hardness of 40 on the Shore D scale, although other degrees of hardness or softness are not precluded. Other polymers that can be employed for instance include polypropylene, mica-filled polypropylene, polyphenylene oxide/nylon blends and mixtures thereof. The foregoing list is not to be construed as limiting but is rather merely exemplary of suitable materials. As best seen in FIG. 3, an embedded knife 54, which extends the circumference of the blow mold 50 into the cavity 55 extending apex 78. The embedded knife creates a reduced cross-sectional area at the apex 78 to facilitate removal of the bubble 80. After the tubular body 12 has cooled and taken its proper shape, the blow mold 50 is opened and the tubular body is removed.

Referring now to FIG. 4, it can be seen that a knife 82 is inserted into the apex 78, which functions as a guide, as to cut the bubble 82 away from the tubular body 12. Once the bubble 80 is removed from each end of the tubular body 12, the open flex end 14 and open angle end 15 are created. Upon removal of the bubble 80, a lip 86 inwardly extends from the annular ring 72. The lip ledge 88 provides a substantially perpendicular transitional area between the lip 86 and the annular ring exterior 74. It should be appreciated that the lip 86 and the lip ledge 88 provide a smooth uniform sealing surface that greatly minimizes the concave surface obtained from a typical blow molded part. Furthermore, the aforementioned cutting operation will not leave behind any burrs or frangible pieces of material as are created when a blow molded part is subjected to a boring or grinding operation. Thus, the possibility of a piece of material coming loose and entering the air duct 10 after it is installed on an air intake system is greatly reduced.

After the cutting operation, the open ends 14,16 are inserted onto the mandrel 90. As seen in FIG. 5, the central core 92 has a diameter equal to or slightly larger than the diameter of the annular neck interior 64. The tubular body 12 is inserted onto the mandrel 90 until the annular shoulder interior 70 abuts or is seated upon the first shoulder 94. Concurrently, the lip 86, which has a diameter appreciably less than the second core 96, exerts a compressive sealing forced around the diameter of the outer core as indicated by the arrows in FIG. 5. Additionally, since the diameter of the second core 96 is less than the diameter of the annular ring interior 76, the annular cavity 104 is formed between the lip 86 and the annular shoulder interior 70.

After the tubular body 12 is fully inserted onto the mandrel 90, both are inserted into the cuff mold 110 which is closed thereon. Referring now to FIG. 6, the neck sealing surface 115 seals around the annular neck exterior 62 in such a mariner that the annular shoulder 66 is secured between the neck sealing surface 115 and the first shoulder 94. Furthermore, the diameter of the neck sealing surface is equal to or less than the diameter of the annular neck 60. The other end of the cavity 118 is formed by the front sealing surface 116 sealing around the sealing face 102 of the mandrel 90.

Referring now to FIG. 7, molten polymeric material is injected into the cavity 118 to form a cuff 30 integral with the tubular body 12. It should be appreciated that large internal pressures are generated within the cavity 118. By virtue of the aforementioned sealing arrangement around the annular neck 60 and the annular shoulder 62, the tubular body is prevented from "sliding" within the mold because of the internal cavity pressure. By positively securing the tubular body during the injection phase, the air duct 10 is manufactured within an acceptable overall length tolerance.

Also formed during the injection mold process is the annular recess 36, a plurality of annular ribs 126, and a truncated conical section 124. Although any polymeric material may be used for the cuff 30, in the preferred embodiment, the cuff will be made of a thermoplastic elastomer (TPE) such as Santoprene®. Typically, the TPE used will have a hardness of 73 on the Shore A scale. Furthermore, the injection molding material used to mold the cuff 30 is compatible with the blow molding material used to form the tubular body 12 and is generally softer to ensure sealing. Other suitable polymers include for instance rubber modified polypropylene, and other TPE,s than Santoprene® although again, the foregoing list is not to be construed as limiting but is rather merely exemplary of suitable materials. In other words, the combination of similar polymeric materials and the heat and pressure obtained during the injection molding process functions to make the cuff 30 integral with the tubular body 12 so as to form a one piece air duct 10.

After the cuff 30 has sufficiently cooled, the cuff mold 110 is opened and the air duct 10 is removed. Any sprue 128 that remains attached to the cuff is removed. It is to be understood that the cuff 30 could also be injected by a hot runner system, thereby eliminating sprue formation.

The finished air duct 10 is then ready for installation upon any receptacle which requires that a flow of air or other gaseous material be transferred from one point to another. First, the open angle end 16 is installed onto a port 40 or some other receptacle which has a diameter substantially equivalent to the diameter of the cuff interior 32. The truncated conical section 124 assists in the installation of the cuff 30 onto the mandrel 40. The adjustable clamp 38 is then tightened so as to compress the annular recess 36 and the annular ribs 126 around the port 40. The annular ribs 126 function in a manner similar to O-rings to provide a substantially air-tight seal around the port 40. Likewise, the open flex end 14 is inserted onto a port 40 or other similar receptacle and secured thereto.

Therefore, by manufacturing an air duct 10 according to the present invention, the attachment, removal and re-attachment of the air duct to a port 40 is easily performed. Furthermore, due to the structural integrity of the one piece air duct 10, the cuff 30 will not become disengaged from the tubular body 12 after repeated cycles of detaching and re-attaching. Furthermore, the use of materials with dissimilar hardnesses provide unique structural features heretofore unavailable in air ducts. The comparatively soft material used to make the cuff 30 allows repeated and long standing compressive forces to be applied thereto. The comparatively rigid material used to make the tubular body 12 prevents collapsing thereof. Both materials are selected to withstand the heat, chemicals, and vibration that the air duct 10 will be subjected to in proximity to an automobile engine.

Based upon the foregoing disclosure, it should now be apparent that the method and device described herein will carry out the objects set forth hereinabove. It should also be apparent to those skilled in the art that the method of the present invention can be practiced to manufacture a variety of air ducts and similar articles, such as integral dust boot, isolator ring and spring seal combinations for suspension systems, having outer connecting means, cuffs or similar members at one or both ends integrally bonded thereto. The methods of the present invention also relate to the manufacture of only the tubular members as well as to the practice of by molding the connecting means onto tubular members, separately formed, in the manner described herein.

It is, therefore, to be understood that any variations evident fall within the scope of the claimed invention and thus, the selection of rubber modified thermoplastics, and thermoplastic elastomers and the shapes of the respective molds and the mandrels can be determined without departing from the spirit of the invention herein disclosed and described. Moreover, the scope of the invention shall include all modifications and variations that may fall within the scope of the attached claims.

What is claimed is:

1. A method for manufacturing an air duct comprising the steps of:

providing a tubular body having at least one open end, wherein said open end has an annular ring extending therefrom which terminates at an inwardly extending lip, said tubular body having an annular neck providing an annular shoulder extending from said annular ring;

obturating said open end with a mandrel, said mandrel having a first shoulder;

exerting a compressive sealing force around said mandrel by said inwardly extending lip;

forming an annular cavity between said mandrel, said annular ring and said lip;

closing an injection mold around said tubular body and said mandrel, wherein said first shoulder will abut the inner diameter of said annular shoulder to positionally locate the tubular body in the injection mold;

injecting a polymeric material into said injection mold to secure connecting means to said tubular body so as to form said air duct;

opening said injection mold; and removing said air duct from said injection mold.

2. A method as set forth in claim 1, wherein said tubular body has a flexible section integral with an angle section.

3. A method as set forth in claim 1, wherein said mandrel has a central core from which outwardly and downwardly extends said first shoulder, said first shoulder having a second core extending downwardly therefrom; said second core having a second shoulder extending outwardly and downwardly therefrom; said second shoulder having a sealing face extending therefrom.

4. A method as set forth in claim 3, said tubular body further providing an annular neck, said annular neck having annular said shoulder extending outwardly therefrom, said annular shoulder having said annular ring extending therefrom.

5. A method as set forth in claim 4, wherein upon insertion of said mandrel into said open end, said central core will have a diameter at least that of the inner diameter of said annular neck, said first shoulder will abut the inner diameter of said annular shoulder, and said second core will have a larger diameter than the inner diameter of said lip such that said lip will exert a compressive sealing force around said second core.

6. A method as set forth in claim 5, wherein said injection mold has a neck sealing surface and a front sealing surface so that when said mandrel with said tubular body disposed thereon is inserted into said mold a cuff cavity is formed.

7. A method as set forth in claim 6, wherein said neck sealing surface seals around the second diameter of said annular neck at said annular shoulder and said front sealing surface seals around said front sealing face.

8. A method as set forth in claim 3, wherein said second core has disposed thereon at least one annular groove.

9. A method as set forth in claim 4, wherein said connecting means is formed around said annular shoulder, and said annular ring, and extends downwardly from said lip, the exterior of said connecting means having an annular recess for receiving an adjustable clamp, the interior of said connecting means having at least one annular rib.

10. A method as set forth in claim 1, wherein said tubular body comprises a propylene/ethylene propylene diene terpolymer blend.

11. A method as set forth in claim 1, wherein said connecting means comprises a thermoplastic elastomer.

12. A method for manufacturing a clean air duct comprising the steps of:

providing a blow mold with at least one imbedded knife;

forming a tubular body in said blow mold, said tubular body having an apex where said imbedded knife is located and having an annular ring;

removing said tubular body from said blow mold;

cutting said tubular body at said apex so as to form an open end wherein said annular ring terminates at an inwardly extending lip;

obturating said open end with a mandrel, exerting a compressive sealing force around said mandrel by said lip, and forming an annular cavity between said mandrel, said annular ring and said lip;

closing an injection mold around said tubular body and said mandrel;

injecting a polymeric material into said injection mold to secure connecting means to said tubular body so as to form said air duct;

opening said injection mold; and removing said air duct from said injection mold.

13. A method as set forth in claim 1, wherein said tubular body has a flexible section integral with an angle section.

14. A method as set forth in claim 12, wherein said mandrel has a central core from which outwardly and downwardly extends a first shoulder, said first shoulder having a second core extending downwardly therefrom; said second core having a second shoulder extending outwardly and downwardly therefrom; said second shoulder having a sealing face extending therefrom.

15. A method as set forth in claim 14, said tubular body further having an annular neck, said annular neck having an annular shoulder extending outwardly therefrom, said annular shoulder having said annular ring extending therefrom.

16. A method as set forth in claim 15, wherein upon insertion of said mandrel into said open end, said central core will have a diameter at least that of the inner diameter of said annular neck, said first shoulder will abut the inner diameter of said annular shoulder, and said second core will have a larger diameter than the inner diameter of said lip such that said lip will exert a compressive sealing force around said second core.

17. A method as set forth in claim 16, wherein said injection mold has a neck sealing surface and a front sealing surface and wherein said second core has a second shoulder extending outwardly and downwardly therefrom, and said second shoulder has a sealing face extending therefrom so that when said mandrel with said tubular body disposed thereon is inserted into said mold a cuff cavity is formed.

18. A method as set forth in claim 17, wherein said neck sealing surface seal around the outer diameter of said annular neck at said annular shoulder and said front sealing surface seals around said front sealing face.

19. A method as set forth in claim 18, wherein said second core has disposed thereon at least one annular groove.

20. A method as set forth in claim 19, wherein said connecting means is formed around said annular shoulder, and said annular ring, and extends downwardly from said lip, the exterior of said connecting means having an annular recess for receiving an adjustable clamp, the interior of said connecting means having at least one annular rib.

21. A method as set forth in claim 12, wherein said tubular body comprises a propylene/ethylene propylene diene terpolymer blend.

22. A method as set forth in claim 12, wherein said connecting means comprises a thermoplastic elastomer.

* * * * *

UNITED STATES PATENT AND TRADEMARK OFFICE
CERTIFICATE OF CORRECTION

PATENT NO. : 5,529,743
DATED : June 25, 1996
INVENTOR(S) : Powell

It is certified that error appears in the above–identified patent and that said Letters Patent is hereby corrected as shown below:

Column 9, line 17, for the claim reference numeral "1", should read --12--.

Signed and Sealed this

Twenty-second Day of October, 1996

Attest:

BRUCE LEHMAN

*Attesting Officer*   *Commissioner of Patents and Trademarks*